(12) United States Patent
Taleyarkhan et al.

(10) Patent No.: US 10,718,874 B2
(45) Date of Patent: Jul. 21, 2020

(54) SYSTEMS AND METHODS FOR INTERROGATING CONTAINERS FOR SPECIAL NUCLEAR MATERIALS

(71) Applicant: PURDUE RESEARCH FOUNDATION, West Lafayette, IN (US)

(72) Inventors: Rusi P. Taleyarkhan, Lafayette, IN (US); Brian C. Archambault, Lafayette, IN (US); Thomas Grimes, Lafayette, IN (US); Alex Hagen, West Richland, WA (US)

(73) Assignee: Purdue Research Foundation, West Lafayette, IN (US)

( * ) Notice: Subject to any disclaimer, the term of this patent is extended or adjusted under 35 U.S.C. 154(b) by 3 days.

(21) Appl. No.: 16/168,797

(22) Filed: Oct. 23, 2018

(65) Prior Publication Data

US 2019/0277984 A1 Sep. 12, 2019

Related U.S. Application Data (60) Provisional application No. 62/575,778, filed on Oct. 23, 2017.

(51) Int. Cl.
*G01T 3/00* (2006.01)
*G21G 4/02* (2006.01)

(52) U.S. Cl.
CPC .............. *G01T 3/001* (2013.01); *G21G 4/02* (2013.01)

(58) Field of Classification Search
None
See application file for complete search history.

(56) References Cited

U.S. PATENT DOCUMENTS

| 2015/0212212 A1* | 7/2015 | Taleyarkhan | ......... H01J 47/001 250/335 |
| 2016/0202360 A1* | 7/2016 | Taleyarkhan | ........... G01T 1/167 376/153 |

* cited by examiner

*Primary Examiner* — Hoon K Song
(74) *Attorney, Agent, or Firm* — Hartman Global IP Law; Gary M. Hartman; Domenica N. S. Hartman (57) ABSTRACT

Methods and systems that utilize centrifugally tensioned metastable fluid detector (CTMFD) sensors and an external probing source to detect the presence of fissile and fissionable materials, including but not limited to special nuclear materials (SNMs), in containers. Such a method includes subjecting a container to probing with a fission-inducing radiation species that induces fission in an fissile or fissionable material, detecting fission neutrons emitted from the fissile or fissionable material with CTMFD sensors that each contain a detection fluid in which the fission neutrons induce cavitation in a centrifugally tensioned portion of the detection fluid. A threshold energy neutron analysis mode is then utilized to reject the radiation species and detect a fraction of the fission neutrons that have energies above a predetermined energy threshold determined by centrifugally-induced tension in the centrifugally tensioned portion of the detection fluid within each of the CTMFD sensors.

20 Claims, 6 Drawing Sheets

SYSTEMS AND METHODS FOR INTERROGATING CONTAINERS FOR SPECIAL NUCLEAR MATERIALS

CROSS REFERENCE TO RELATED APPLICATIONS

This application claims the benefit of U.S. Provisional Application No. 62/575,778, filed Oct. 23, 2017, the contents of which are incorporated herein by reference.

STATEMENT REGARDING FEDERALLY SPONSORED RESEARCH

This invention was made with government support under Contract No. 2014-DN-077-ARI090 awarded by the U.S. Department of Homeland Security. The Government has certain rights in the invention.

BACKGROUND OF THE INVENTION

The present invention generally relates to the detection of fissile and fissionable materials, including but not limited to special nuclear materials (SNMs) such as uranium-235 (U-235, also known as high enriched uranium, or HEU) and plutonium-239 (Pu-239). The invention particularly relates to methods and systems that utilize tensioned metastable fluid detector (TMFD) sensors and an external probing source to interrogate containers to detect the presence of SNM and other fissile and fissionable materials.

It is well understood that the consequences of the detonation of atomic weapons, even those small enough to be smuggled in a suitcase, crate, or other relative small container, would be catastrophic if used against a populated target. The National Academy of Engineering listed combating nuclear terror as one of the organization's twenty-first century "Grand Challenges," and has particularly identified various aspects of this challenge, including the necessity to detect nuclear materials, especially at a distance. Such systems would ideally be portable and capable of rapidly and efficiently detecting SNM located anywhere within a container. However, existing systems capable of detecting SNMs in typical cargo containers may require multiple scans performed with heavy, non-portable equipment that can require tens of minutes or more in order to determine the presence of HEU.

In view of the above, it can be appreciated that it would be desirable if portable systems and methods were available that were capable of more rapidly and efficiently detecting containers bearing SNMs or another fissile or fissionable material.

BRIEF DESCRIPTION OF THE INVENTION

The present invention provides methods and systems that utilize tensioned metastable fluid detector (TMFD) sensors and an external probing source to detect the presence of fissile and fissionable materials in containers.

According to one aspect of the invention, methods and systems are provided that include a probing source to induce fission in a fissile or fissionable material, and to detect fissioned neutrons having energy levels above a predetermined energy threshold of the probing source using gamma-beta blind centrifugally tensioned metastable fluid detectors (CTMFDs).

According to another aspect of the invention, methods and systems are provided that include an apparatus for reflecting neutrons using reflector-moderator-container re-configuration combinations to permit detection of fissile and fissionable materials at any arbitrary location within a container that may be filled with various metallic-hydrogenous media.

According to yet another aspect of the invention, a method of detecting a quantity of a fissile or fissionable material within a container includes subjecting the container to probing with a fission-inducing radiation species that induces fission in the fissile or fissionable material, detecting fission neutrons emitted from the fissile or fissionable material with centrifugally tensioned metastable fluid detector (CTMFD) sensors that each contain a detection fluid in which the fission neutrons induce cavitation in a centrifugally tensioned portion of the detection fluid. A threshold energy neutron analysis mode is then utilized to reject the radiation species and detect a fraction of the fission neutrons that have energies above a predetermined energy threshold determined by centrifugally-induced tension in the centrifugally tensioned portion of the detection fluid within each of the CTMFD sensors.

According to still another aspect of the invention, a system for detecting a quantity of a fissile or fissionable material within a container includes an external probing source for subjecting the container to probing with a fission-inducing radiation species that induces fission in the fissile or fissionable material, and centrifugally tensioned metastable fluid detector (CTMFD) sensors that detect fission neutrons emitted from the fissile or fissionable material. The CTMFD sensors each contain a detection fluid, and the CTMFD sensors are rotatable to create a centrifugally tensioned portion of the detection fluid therein in which cavitation can be induced by the fission neutrons. The system further includes processing means utilizing a threshold energy neutron analysis mode to reject the radiation species and detect a fraction of the fission neutrons that have energies above a predetermined energy threshold determined by centrifugally-induced tension in the centrifugally tensioned portion of the detection fluid within each of the CTMFD sensors.

Additional aspects of the invention include methodologies for compensating for temperature/CTMFD geometry/ambient variations that enable uniform rejection of probing source radiation and detection of induced fission neutrons above a predetermined energy threshold.

Technical aspects of methods and systems described above preferably include the ability to rapidly and efficiently detect fissile and fissionable materials in a variety of containers, including but not limited to cargo containers and similarly sized containers in which fissile and fissionable materials could be concealed within various other materials. Preferred embodiments of such systems are preferably configured to be man-portable, capable of being rapidly set up, and then capable of rapidly and conclusively detecting the presence of a fissile or fissionable material, for example, quantities of as little as 1 kg or less of an SNM, within seconds.

Other aspects and advantages of this invention will be appreciated from the following detailed description.

DETAILED DESCRIPTION OF THE INVENTION

The following describes certain aspects of active interrogation methods and systems that utilize centrifugally tensioned metastable fluid detector (CTMFD) sensors operating in what will be referred to herein as a threshold energy neutron analysis (TENA) mode to detect, in combination with an external probing source, the presence of SNMs in containers that may further contain various other material, as nonlimiting examples, metallic and hydrogenous materials. Nonlimiting examples of external probing sources include sources of fission-inducing radiation species such as deuterium-deuterium (D-D) neutron generators (accelerators), proton-Be accelerator neutron sources that emit low energy neutrons, and e-beam based X-ray photoneutron producing sources. Nonlimiting examples of SNMs include U-233, U-238, U-235, Pu-239 and other Pu isotopes, Am-241, Np-237, and actinide isotopes that exhibit induced fission and neutron production when probed with neutrons or photons. However, the invention is believed to be more generally applicable to the detection of fissile and fissionable materials.

Figure 1:
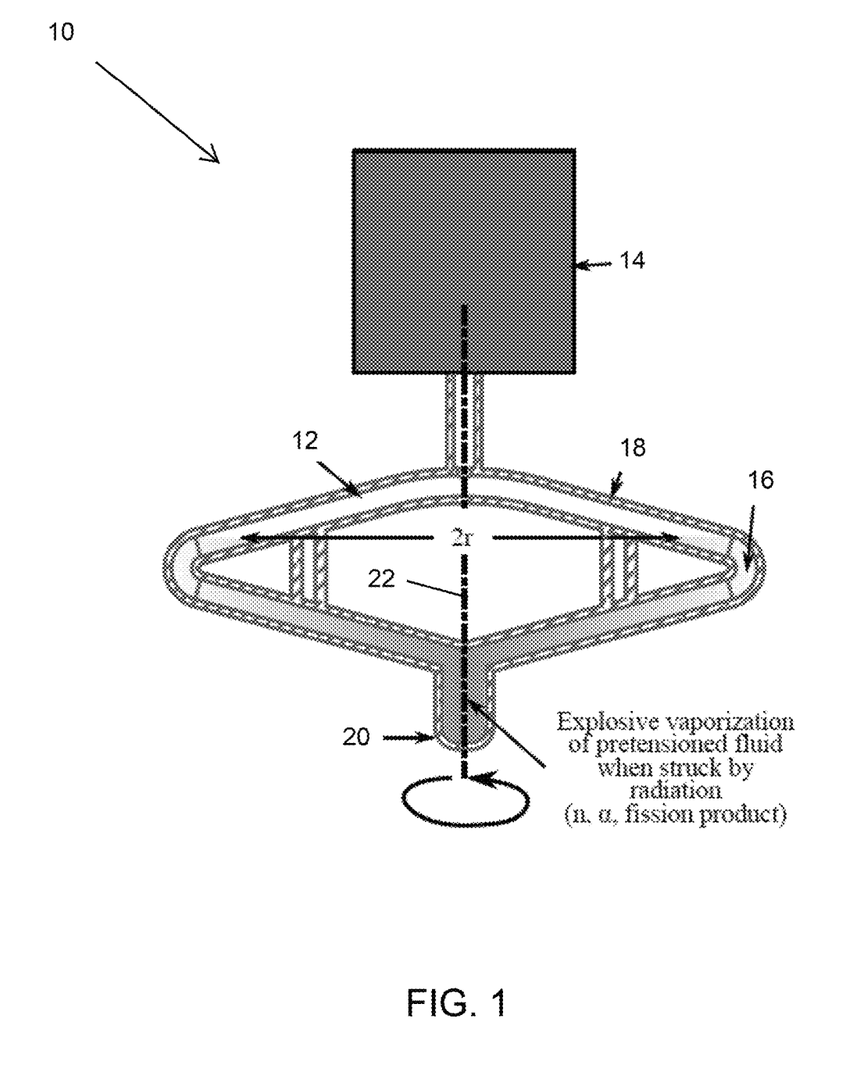
FIG. 1 schematic represents a CTMFD sensor capable of use with active interrogation methods and systems in accordance with a nonlimiting embodiment of this invention.
Figure 2:
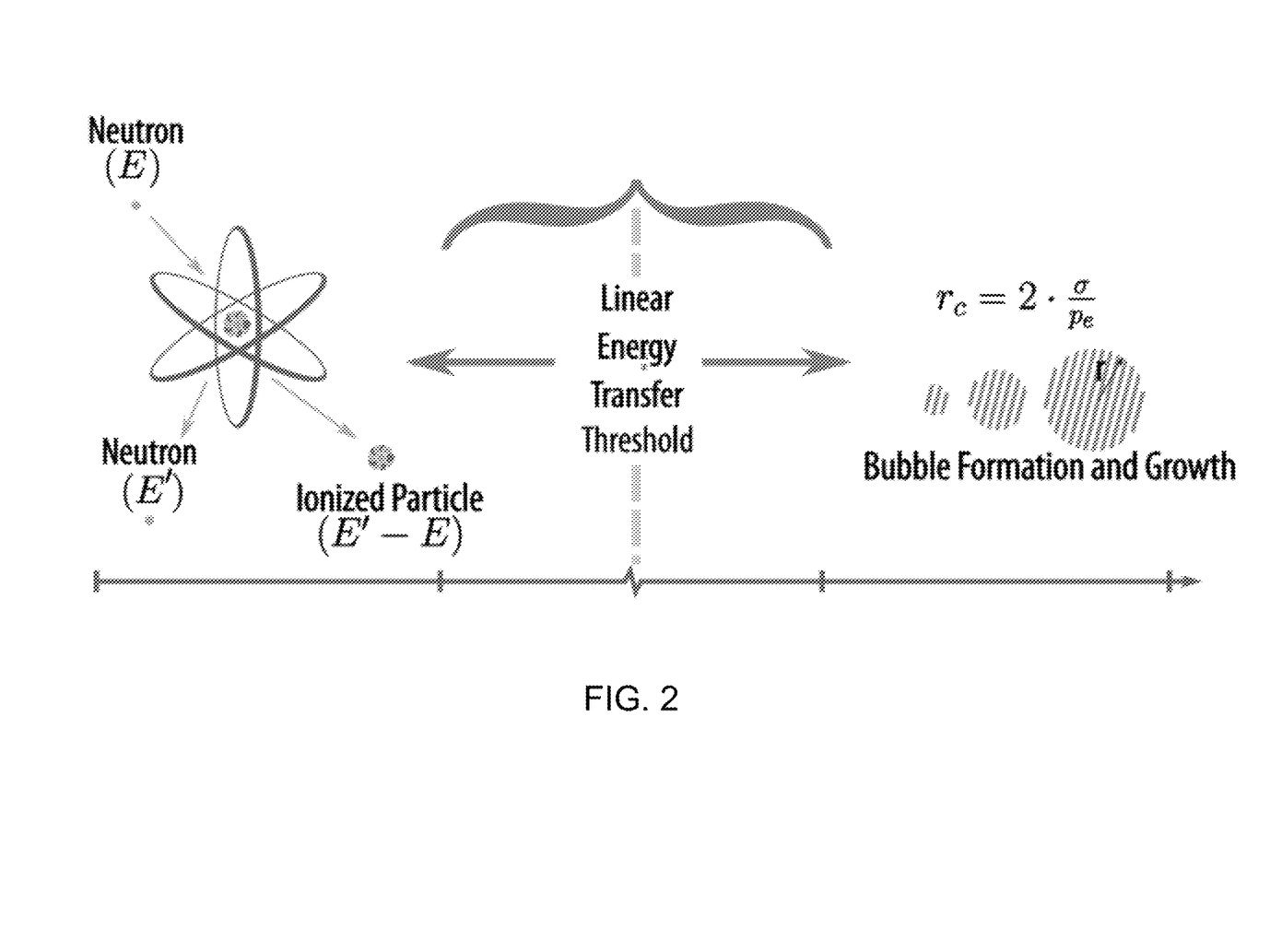
FIG. 2 schematically illustrates ionizing radiation detection principles utilizing TMFD sensors of the type depicted in FIG. 1 in accordance with nonlimiting embodiments of this invention.

FIG. 1 schematically represents a CTMFD sensor 10 as a particular type that has been evaluated for use by methods and systems within the scope of this invention. CTMFD operational principles utilized by the present invention rely on the macro-mechanical effect of energetic nuclear particles on tensioned liquids. As schematically represented in FIG. 2, neutrons elastically scatter off with target atoms (or may interact via neutron absorption) to result in recoil ions depositing their energy within a fluid space, thereby, causing localized hot spots in the nanometer range which, if they satisfy the nucleation criterion for size, may then grow to macroscopic size which can then be seen/heard by humans and also electronically detected. CTMFDs operate on the principle that fluids can be tensioned similar to solids. Systems and methods of this invention make use of this phenomenon by rotating a CTMFD (such as the sensor 10 represented in FIG. 1) to centrifugally tension a fluid to its spinodal limit, enabling nuclear particles to weaken intermolecular bonds and cause the tensioned fluid to cavitate below its spinodal limit. Cavity formation depends on overcoming energy barriers, and energy for cavity formation is donated by an energetic ion. The critical bubble diameter is on the order of 100s of nanometers, and a cavity that reaches the critical radius will continue to grow to fill a negative pressure field. Linear energy transfer (LET) is the critical quantity due to short track length. Generally, highly charged particles (high Z) have a large advantage in depositing energy, and therefore cavity formation within the CTMFD sensor 10 is completely insensitive top β and γ at tension levels that can be used by the methods and systems hereof for neutron detection.

The CTMFD sensor 10 represented in FIG. 1 comprises a glass enclosure 12 coupled to a variable speed motor 14 to enable rotation of the sensor 10 about an axis 22 of symmetry thereof. The enclosure 12 defines a cavity comprising a pair of opposing V- or U-shaped arms that are fluidically connected to define a continuous sensing volume. The enclosure 12 contains a detection fluid 16 that does not entirely fill the sensing volume such that an air cavity 18 is present within the enclosure 12. The fluid 16 defines a meniscus on each side of the enclosure 12 where the fluid 16 interfaces with the air cavity 18 in each arm of the sensing volume. The enclosure 12 further comprises a portion, referred to herein as a bulb 20, that is fluidically connected to the remainder of the sensing volume and extends along the sensor axis 22. Within the bulb 20, a volume of the fluid 16 can be sufficiently pretensioned as the sensor 10 is rotated to cause a decrease in pressure within the bulb 20 along an isotherm, inducing a tensioned negative pressure ($P_{neg}$) in that portion of the fluid 16 within the bulb 20. In the metastable region, the addition of a nucleation center allows for rapid phase change and bubble growth within the fluid 16, and a sufficiently low $P_{neg}$ within the bulb 20 allows for explosive vaporization to occur in the fluid 16 contained therein when struck by radiation (n, α, fission product). Vaporization of the fluid 16 within the bulb 20 can be detected audibly and/or visually by a human as well as with the use of appropriate electronic sensing devices of types known in the art.

Varying the rotational speed of the enclosure 12 and/or the separation distance between the menisci allows for precise control of $P_{neg}$. In turn, control of the $P_{neg}$ state allows for the determination of a threshold neutron energy for detection via bubble formation, by which the aforementioned TENA mode can be used to precisely reject and detect, respectively, neutrons below and above a predetermined energy threshold determined by the rotational speed of the CTMFD sensor 10. The rotational speed is a function of the arm separation, fluid density, and temperature of operation, all of which dictate the necessary $P_{neg}$ state for TENA applications. As such, an aspect of the invention is to control the rotational speed of the CTMFD sensor 10 to establish and control a predetermined threshold energy employed by the aforementioned TENA mode to detect the presence of an SNM in which fission has been induced by fission-inducing radiation species generated by an external probing source. In a well-degassed TMFD fluid that is also free of spurious nucleating agents such as dirt particles, the $P_{neg}$ state required for detecting a given energy ionizing particle (n, α, fission product) is also a function of the fluid temperature—the higher the fluid temperature, the lesser is the tension state required for explosive vaporization. As such, another preferred aspect of the invention is to consider the temperature of the detection fluid 16 of the CTMFD sensor 10 when establishing and controlling the predetermined threshold energy.

Figure 3:
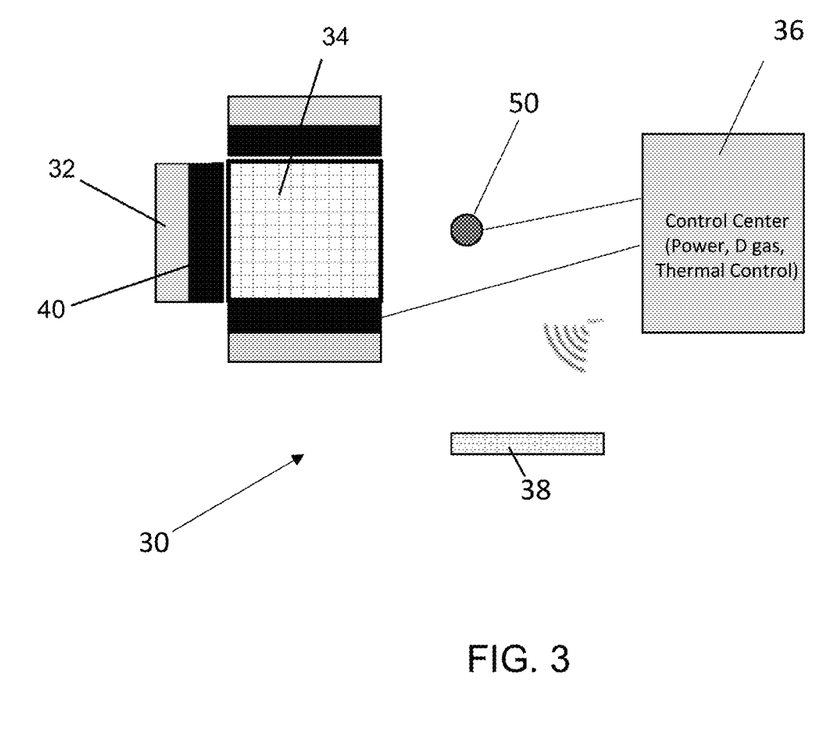
FIG. 3 schematically represents a mobile/portable active interrogation system that utilizes a neutron generator (accelerator) device that uses either a solid or gas target enabling DD nuclear reaction neutrons as a probing source to interrogate a container surrounded by CTMFD sensors and reflectors.
Figure 4:
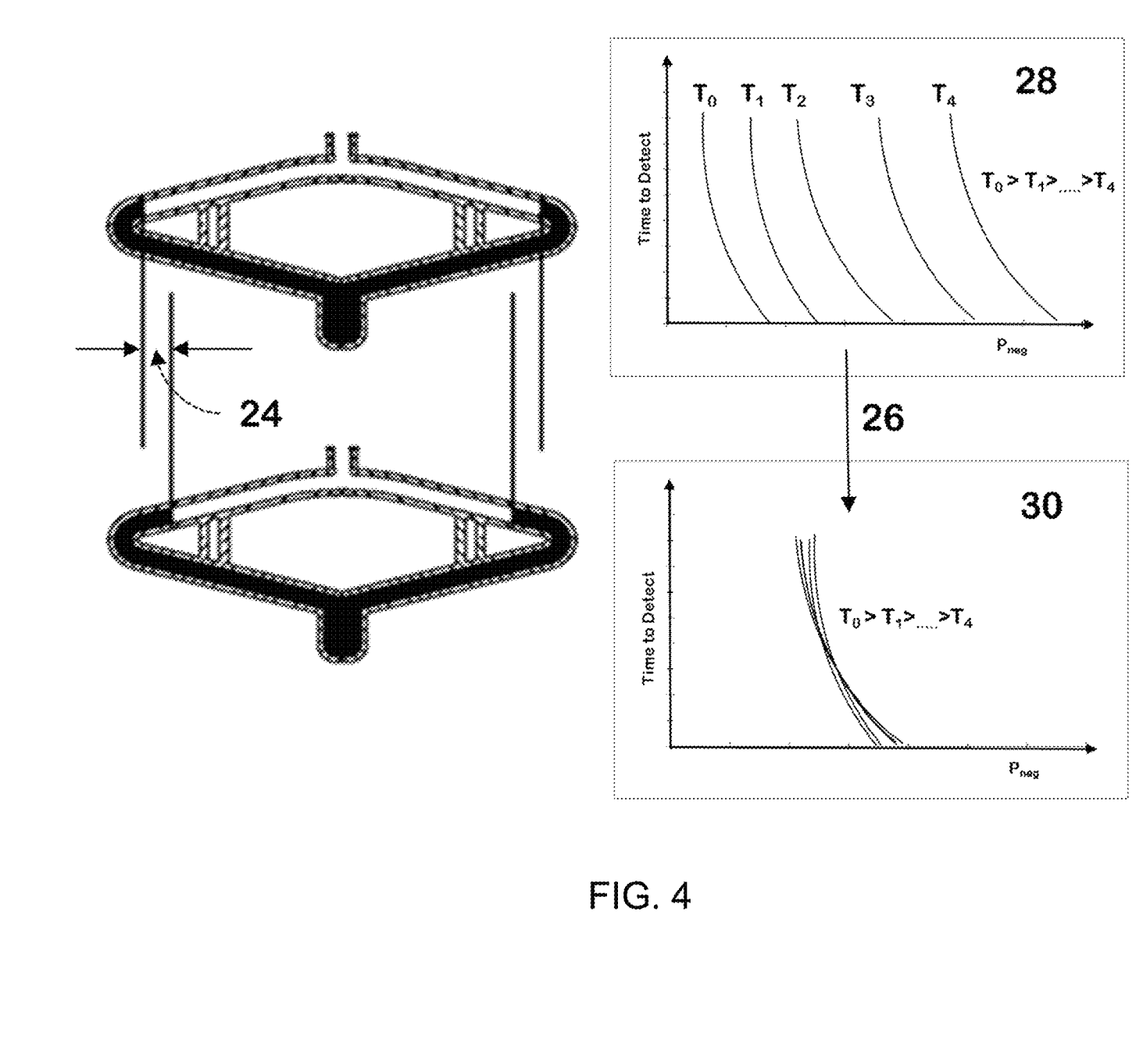
FIG. 4 schematically illustrates how geometry changes along with detection efficiency response functions at various temperatures can be collapsed to provide a single equivalent response function for rejection of probing radiation and detecting induced fission neutron radiation from SNM fission.

FIG. 3 schematically represents a nonlimiting example of a system 30 including a D-D neutron accelerator 50 capable for use in active interrogation methods of the present invention, and FIG. 4 schematically represents the accompanying methodology for tuning the CTMFD sensors 10 to dynamically compensate for geometrical variations in the fluid meniscus as a function of temperature. The D-D neutron accelerator 50 in FIG. 3 can be an inertial electrostatic confinement (IEC) deuterium (D) gas-flow through type system or a conventional solid target based accelerator, driven and controlled externally by a high-voltage generating device 36 coupled to a data acquisition system 38, which may be any suitable type of computing means with a processor capability for carrying out processing that includes the TENA mode. Furthermore, any other type of variable energy neutron generator (e.g., proton accelerator) may be used. Lower interrogating neutron energy can cause higher fission rates in SNMs like HEU (because the fission probability is inversely dependent on the incident neutron energy), but lower energy neutrons limits the ability to more deeply penetrate cargo (especially cargo containing hydrogenous matter such as water, paper, etc.). The fission-inducing radiation species may also be high energy photons, e.g., X-ray sources preferably with end-point energies above the photoneutron/fission threshold of SNMs, such as around 5 MeV for U-238 to induce photoneutron or photofission neutron production. Operational aspects of such probing sources will be generally understood by those skilled in the art and therefore will not be described in any detail here.

The nonlimiting embodiment of the system 30 is represented in FIG. 3 as comprising three detector assemblies 32, each comprising a CTMFD sensor 10 (not shown) of a type described above in reference to FIG. 1. The detector assemblies 32 may also be beneficially accompanied with reflection-moderating neutron lensing material 40. The neutron accelerator 50 also may be similarly surrounded with a reflecting material (not shown) to maximize the interrogating neutron population into the container 34. The detector assemblies 32 are arranged so that their CTMFD sensors 10 are configured in an array surrounding a container 34 to be interrogated by the system 30.

Figure 5:
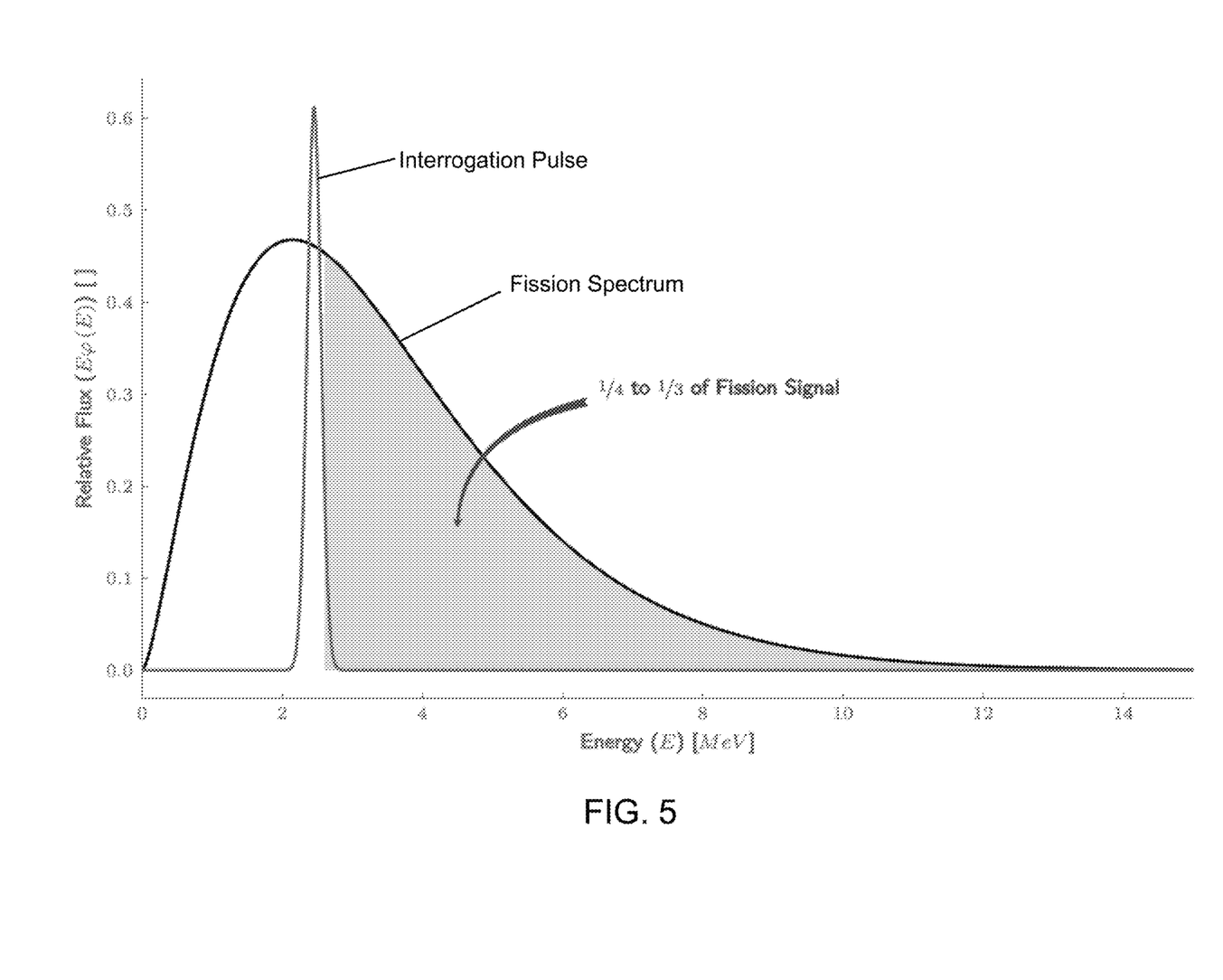
FIG. 5 schematically represents a technique that may be employed by the system of FIG. 3 to discriminate interrogating D-D (2.5 MeV) neutrons from higher energy (>2.5 MeV) neutrons from induced fission in SNMs.

As defined and explained herein, the TENA mode is used to describe a method capable of precisely detecting rejected neutrons below certain energy levels. In the context of the system 30 represented in FIG. 3, the TENA mode is a detection technique capable of distinguishing interrogating neutrons (or another fission-inducing radiation species) from resulting fission neutrons. In embodiments in which the D-D neutron accelerator 50 uses low energy (e.g., 2.5 MeV) neutrons to induce fission within an SNM, for example, HEU, the TENA mode can be used to distinguish the interrogating 2.5 MeV neutrons from the resulting fission neutrons ejected by an SNM. As represented in FIG. 5, induced fission results in neutrons of energies of up to about 10 MeV, with the fraction of fission spectrum neutrons above 2.5 MeV being typically about 25% to about 30%, depending on angular energy dependence of the neutron accelerator 50. The TENA mode of detection utilizes efficient rejection of the interrogating neutrons as well as the induced fission neutrons having energies of less than 2.5 MeV, while efficiently counting/detecting the fission neutrons having energies above 2.5 MeV. To detect an approximately 1 kg quantity of an SNM such as HEU at a distance of about one meter requires much higher levels of interrogating neutrons than can be produced from fission in the targeted SNM, for example, levels×$10^3$ to ×$10^4$ higher. The challenge then becomes one in which a fission neutron signal (1 in about $10^4$ background) must be detectable with an acceptable low false alarm signal (for example, less than 5%) with high confidence (preferably greater than 95%) within a relatively short time span (preferably in a span of seconds to minutes), all while also remaining blind to all other interfering background radiation (as nonlimiting examples, induced gamma-beta rays and cosmic radiation). The challenge of remaining blind to background radiation becomes even more challenging if the external probing source (for example, a DD neutron accelerator) also emits 14 MeV neutrons or if the external probing source itself comprises photons (for example, X-rays from an electron accelerator). The dynamic compensation features for geometrical changes and detection efficiency changes with temperature are depicted schematically in FIG. 4.

The array of detector assemblies 32 depicted in FIG. 3 is preferably arranged to provide consistent as-desired efficiency of detection of an SNM within the container 34 while accounting for variables, as nonlimiting examples, variations in the size of the sensors 10 (for example, to provide geometry-based effect corrections), temperature variations on a real-time dynamic basis (for example, temperature compensation of the detection fluid 16), variations in tensioned fluid states (for example, $P_{neg}$ correction), variations in the types and sizes of containers that may be interrogated and non-SNM materials that may be present, and possible variations in the position of an SNM within a container that may be interrogated.

The ability of a system 30 configured as represented in FIG. 3 to attain the above-mentioned operational aspects was established through experimentation supplemented by extensive theoretical modeling and simulations. Experimentation included direct validation for proof-of-concept using surrogate fission source (spontaneous fission Cf-252 source) as well as direct interrogation with a DD neutron accelerator (neutron source) of U-235 bearing uranium dioxide with single CTMFD sensors and CTMFD sensors in array forms, with and without various configurations of structural media to provide optimal detection of SNMs. The unequivocal correction for 14 MeV neutrons involved testing for $P_{neg}$ thresholds in CTMFD sensors using a dedicated D-T neutron accelerator.

In investigations leading to the present invention, CTMFD sensors having enclosures with sensing volume sizes ranging from about 3 $cm^3$ to about 60 $cm^3$ were developed and tested. Though essentially any fluid could be used, acetone, decaflouropentane, and trimethylborate are of particular interest and the investigations used decafluoropentane ($C_5H_2F_{10}$, $\rho$=1.58 g/cm3) as the detection fluid. The weight and size of the enclosure 12 was about 2 kg and about 21×21×26 cm (D×W×H), rotated by a 150 W BLDC motor. The investigations verified that CTMFD sensors configured and operated as represented in FIG. 1 were completely insensitive to β and γ (gamma-beta "blind") and provided unique dynamic capabilities, including the ability to compensate for geometry variations between individual CTMFD sensors and the ability to compensate for variations in the temperatures of the detection fluids within different CTMFD sensors, ensuring consistent neutron detection efficiency among the CTMFD sensors. Though operating at different temperatures, the CTMFD sensors exhibited approximately the same (within +/−20%) signal-to-background rejection ratio, including the possible presence of 14 MeV neutrons due to D-T reactions within the D-D neutron accelerator device. The investigations also confirmed the ability of the array of sensors to search for SNMs within a container though the SNMs may be positioned anywhere within the array, and the ability to account for various types of cargo fill within the containers.

The system 30 evaluated during the investigations was also capable of accounting for and rejecting the effects of tritium (T) buildup that may occur with neutron sources such as D-D neutron accelerators, and especially those that utilize solid targets. Buildup of tritium from D-D interactions within D-D neutron accelerators results in 14 MeV neutrons due to D-T interactions, which can result in background effects that must be accounted for while detecting SNMs within a container using a D-D accelerator type neutron source in the TENA mode of detection employed by the system 30 and method. A protocol to enable nearly 100% rejection of interrogating radiation neutrons depends on accounting for such 14 MeV background neutrons, the intensity of which can vary widely with the age, type and operation of DD accelerators. A sufficiently large 14 MeV background that has not corrected for can destroy the TENA mode induced fission signal. Solid target accelerators will be more prone to such background versus gaseous IEC type accelerators, wherein the tritium can be flushed on a continual basis. The protocol to follow in general involves first monitoring for the presence of a 14 MeV neutron background while the probing source is operating in the absence of SNM, and thereafter subtracting the resulting count rate when engaging in TENA mode interrogation.

Figure 6:
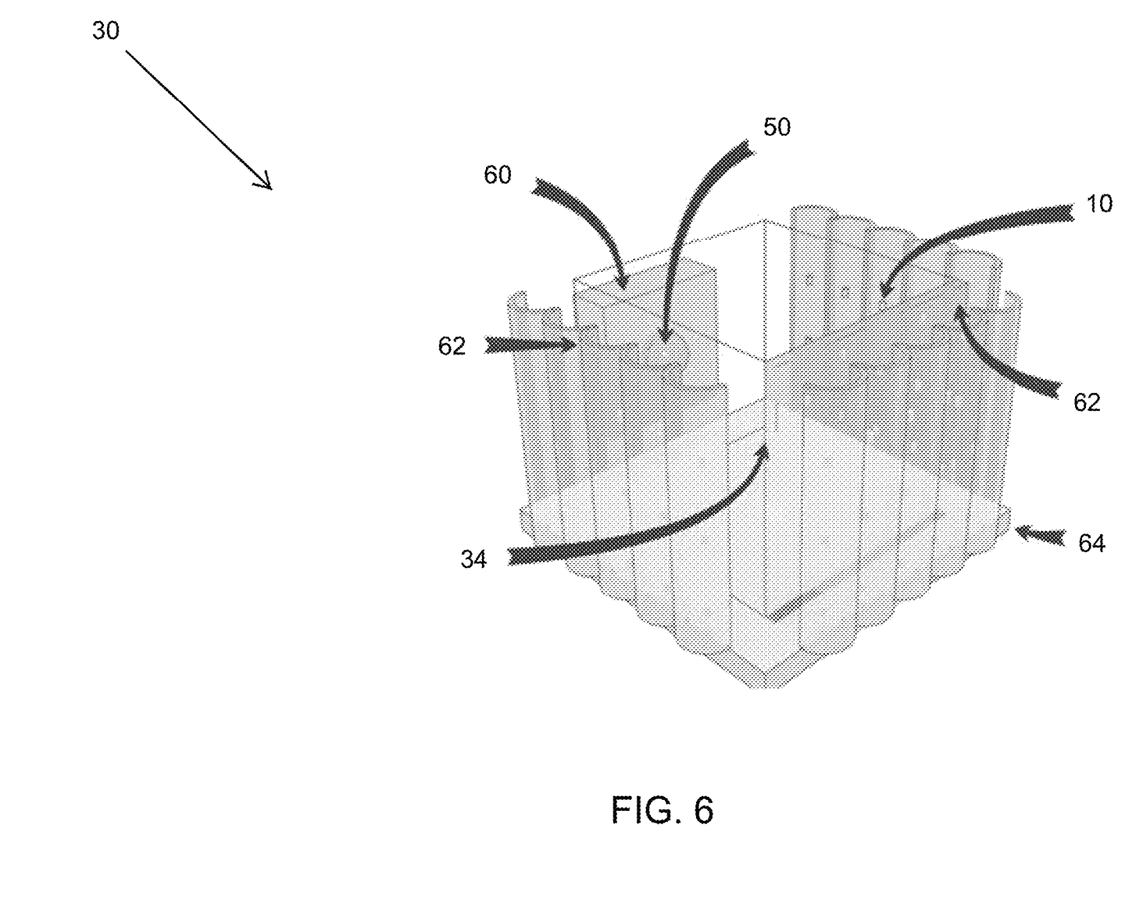
FIG. 6 schematically represents the system of FIG. 3 modified to include lenses having concave shapes for enhancing the rate of fission induced in an SNM within a container via selective reflection and enhancing the detection of the SNM by reflecting neutrons back into the container in accordance with nonlimiting aspects of this invention.

Investigations leading to the invention also explored various methods to enhance the rate of induced fission in an SNM within a container, thereby offering the ability to potentially reduce the requirements for the neutron accelerator 50 (or another external probing source of fission-inducing radiation species) and, by association, to possibly reduce the demands on and/or number of CTMFD sensors 10 required by the system 30. FIG. 6 schematically depicts an embodiment of the system 30 in which a lens 60 has been placed between an external probing source 50 and a container 34 being interrogated for the presence of an SNM, and additional lenses 62 have been placed around the container 34. The lenses 60 and 62 enable the system 30 to reflect back neutrons into the container 34, which may be filled with metallic, hydrogenous, or multiple types of cargo in which an SNM could be positioned anywhere. The lens 60 surrounds the external probing source 50, and the lenses 62 are adjacent the CTMFD sensors 10 surrounding the container 34. The efficient detection of an SNM depends on the number of induced fissions and also the number of TENA fission neutrons that arrive at the sensors 10. SNMs positioned at corners of the container 34 farthest from the probing source 50 can be expected to provide the least number of detection signals. To further enhance the detection of an SNM anywhere within the container 34, the container 34 is represented in FIG. 6 as supported on a platform 64 capable of swiveling so that the container 34 can be rotated while remaining surrounded by the CTMFD sensors 10 and external probing source 50.

As noted above in reference to FIG. 4, certain aspects of methods and systems of this invention include the ability to compensate for variations in the temperature and tensioned state of the detection fluid 16. Because the response of the CTMFD sensors 10 to radiation is dependent on the temperature of the detection fluid 16, which influences the density of the fluid 16 and the location of the meniscus of the fluid 16 within the enclosure 12, active compensation for variations in the fluid temperature is desirable to achieve more stable and reliable sensitivity of the sensors 10. Basic temperature compensation approaches preferably take changes in the fluid meniscus and density into consideration (indicated at 24 in FIG. 4). More advanced temperature compensation may further include accounting for additional shifts in the CTMFD sensitivity to radiation induced by changes in the average negative pressure ($P_{neg}$) in the enclosure 12 (due to changes in the fluid meniscus) and other fundamental fluid parameters, e.g., surface tension, enthalpy of vaporization, viscosity, vapor pressure, etc. (indicated at 26 in FIG. 4). Such compensation methodologies were investigated and corroborated with experimental data, which showed that the CTMFD sensor 10 configured as shown in FIG. 1 is able to accommodate dynamic temperature compensation over a large temperature range, collapsing the sensitivity at many temperatures (indicated at 28 in FIG. 4) to a single sensitivity curve (indicated at 30 in FIG. 4), allowing for accurate determination of a neutron energy threshold. The temperature compensation methodologies included algorithms that accommodated for geometric correction (meniscus and density) and negative pressure ($P_{neg}$) correction, as well as techniques for estimating the temperature of the fluid 16 within the enclosure 12 using an infrared (IR) thermopile temperature sensor.

Another embodiment involves the use of only an air temperature sensor to estimate the temperature of the detection fluid 16 on the premise that the fluid temperature is in equilibrium with the air temperature in the enclosure 12. This method is accurate if a negligible amount of heat is generated by the motor 14 and transferred through the motor shaft to the enclosure 12 and its detection fluid 16. This case is applicable when a high efficiency brushless DC motor is used to rotate a sensor 10, but not sufficiently reliable if a brushed AC motor is used. Another approach is to utilize wireless data transmission in combination with a traditional contact thermocouple or thermistor type temperature sensor attached to the outside of the enclosure 12. The temperature measurement is then recorded and transmitted back to a base communication station, with which the proper adjustments may be made during rotation of the CTMFD sensor 10. The fluid temperature can then be estimated to be at equilibrium with the enclosure temperature.

While the invention has been described in terms of a particular embodiment and investigations, it should be apparent that alternatives could be adopted by one skilled in the art. For example, the system and its components could differ in appearance and construction from the embodiment described herein and shown in the drawings, functions of certain components of the system could be performed by components of different construction but capable of a similar (though not necessarily equivalent) function, and appropriate materials could be substituted for those noted. As such, it should be understood that the above detailed description is intended to describe the particular embodiment represented in the drawings and certain but not necessarily all features and aspects thereof, and to identify certain but not necessarily all alternatives to the represented embodiment and described features and aspects. As a nonlimiting example, the invention encompasses additional or alternative embodiments in which one or more features or aspects of the disclosed embodiment could be eliminated. Accordingly, it should be understood that the invention is not necessarily limited to any embodiment described herein or illustrated in the drawings, and the phraseology and terminology employed above are for the purpose of describing the illustrated embodiment and investigations and do not necessarily serve as limitations to the scope of the invention. Therefore, the scope of the invention is to be limited only by the following claims.

The invention claimed is:

1. A method of detecting a quantity of a fissile or fissionable material within a container, the method comprising:
    subjecting the container to probing with a fission-inducing radiation species that induces fission in the fissile or fissionable material;
    detecting fission neutrons emitted from the fissile or fissionable material with centrifugally tensioned metastable fluid detector (CTMFD) sensors that each contain a detection fluid, the fission neutrons inducing cavitation in a centrifugally tensioned portion of the detection fluid within each of the CTMFD sensors; and
    utilizing a threshold energy neutron analysis mode to reject the radiation species and detect a fraction of the fission neutrons that have energies above a predetermined energy threshold determined by centrifugally-induced tension in the centrifugally tensioned portion of the detection fluid within each of the CTMFD sensors.

2. The method of claim 1, wherein the centrifugally tensioned portions of the detection fluid are induced within the CTMFD sensors by rotating each of the CTMFD sensors about a rotational axis thereof.

3. The method of claim 2, wherein each of the centrifugally tensioned portions of the detection fluid is within a bulb of each of the CTMFD sensors that is disposed on the rotational axis of a corresponding one of the CTMFD sensors.

4. The method of claim 2, wherein the predetermined energy threshold is determined by rotational speeds of the CTMFD sensors.

5. The method of claim 1, wherein the radiation species comprises neutrons, photoneutrons, or photofission neutrons emitted by an external probing source.

6. The method of claim 1, wherein the radiation species comprises D-D neutrons emitted by an external probing source.

7. The method of claim 6, wherein the external probing source is a D-D neutron generator.

8. The method of claim 6, wherein the predetermined energy threshold is higher than a neutron energy level of the neutrons emitted by the external probing source.

9. The method of claim 1, wherein the cavitation induced in the centrifugally tensioned portion of the detection fluid is detected audibly and/or visually by a human or with an electronic device.

10. The method of claim 1, further comprising enhancing the rate of fission induced in the fissile or fissionable material via selective reflection of the fission-inducing radiation species using a lens having a concave shape.

11. The method of claim 1, further comprising compensating for temperature variations in the detection fluid within each of the CTMFD sensors.

12. The method of claim 1, wherein the fissile and fissionable material is a special nuclear material.

13. A system for detecting a quantity of a fissile or fissionable material within a container, the system comprising:
    an external probing source for subjecting the container to probing with a fission-inducing radiation species that induces fission in the fissile or fissionable material;
    centrifugally tensioned metastable fluid detector (CTMFD) sensors that detect fission neutrons emitted from the fissile or fissionable material, the CTMFD sensors each containing a detection fluid, the CTMFD sensors being rotatable to create a centrifugally tensioned portion of the detection fluid therein in which cavitation can be induced by the fission neutrons; and
    processing means utilizing a threshold energy neutron analysis mode to reject the radiation species and detect a fraction of the fission neutrons that have energies above a predetermined energy threshold determined by centrifugally-induced tension in the centrifugally tensioned portion of the detection fluid within each of the CTMFD sensors.

14. The system of claim 13, wherein each of the centrifugally tensioned portions of the detection fluid is within a bulb of each of the CTMFD sensors that is disposed on a rotational axis of a corresponding one of the CTMFD sensors.

15. The system of claim 13, wherein the predetermined energy threshold is higher than a neutron energy level of the neutrons emitted by the external probing source.

16. The system of claim 13, wherein the external probing source emits D-D neutrons as the radiation species.

17. The system of claim 16, wherein the external probing source is a D-D neutron generator.

18. The system of claim 13, wherein the predetermined energy threshold is determined by rotational speeds of the CTMFD sensors.

19. The system of claim 13, wherein the CTMFD sensors are arranged in an array around the container.

20. The system of claim 13, further comprising a lens having a concave shape and placed in proximity to the external probing source and enhancing the rate of fission induced in the fissile or fissionable material via selective reflection of the fission-inducing radiation species.

* * * * *